United States Patent
Seagle et al.

(10) Patent No.: US 11,074,930 B1
(45) Date of Patent: Jul. 27, 2021

(54) READ TRANSDUCER STRUCTURE HAVING AN EMBEDDED WEAR LAYER BETWEEN THIN AND THICK SHIELD PORTIONS

(71) Applicant: International Business Machines Corporation, Armonk, NY (US)

(72) Inventors: David Seagle, Morgan Hill, CA (US); Robert Biskeborn, Hollister, CA (US); Calvin Shyhjong Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/871,888

(22) Filed: May 11, 2020

(51) Int. Cl.
*G11B 5/39* (2006.01)
*G11B 5/008* (2006.01)

(52) U.S. Cl.
CPC ........ *G11B 5/3929* (2013.01); *G11B 5/00813* (2013.01); *G11B 5/3909* (2013.01)

(58) Field of Classification Search
None
See application file for complete search history.

(56) References Cited

U.S. PATENT DOCUMENTS

| | | | |
|---|---|---|---|
| 4,610,935 A | 9/1986 | Kumasaka et al. | |
| 5,668,686 A | 9/1997 | Shouji et al. | |
| 5,668,688 A | 9/1997 | Dykes et al. | |
| 5,729,410 A | 3/1998 | Fontana, Jr. et al. | |
| 5,838,521 A | 11/1998 | Ravipati | |
| 5,862,022 A | 1/1999 | Noguchi et al. | |
| 5,880,910 A | 3/1999 | Shouji et al. | |
| 5,898,547 A | 4/1999 | Fontana, Jr. et al. | |
| 5,898,548 A | 4/1999 | Dill et al. | |
| 5,963,401 A | 10/1999 | Dee et al. | |
| 6,185,080 B1 | 2/2001 | Gill | |
| 6,198,609 B1 | 3/2001 | Barr et al. | |
| 6,209,193 B1 | 4/2001 | Hsiao | |

(Continued)

FOREIGN PATENT DOCUMENTS

| EP | 0911811 A2 | 4/1999 |
|---|---|---|
| EP | 1471543 A2 | 10/2004 |

(Continued)

OTHER PUBLICATIONS

Biskeborn et al., "Linear Magnetic Tape Heads and Contact Recording," ECS Transactions, vol. 50, 2012, pp. 19-33.

(Continued)

*Primary Examiner* — William J Klimowicz
(74) *Attorney, Agent, or Firm* — Zilka-Kotab, P.C.

(57) ABSTRACT

In one general approach, an apparatus includes a read transducer structure having a media facing surface. The read transducer structure has a lower shield, and an upper shield formed above the lower shield. The upper and lower shields providing magnetic shielding. A current-perpendicular-to-plane sensor is positioned between the upper and lower shields. A dielectric layer extends into one of the shields from the media facing surface. The dielectric layer extends into the one of the shields for a distance that is less than a height of the one of the shields. Preferably, a first dielectric layer extends into the lower shield from the media facing surface, and a second dielectric layer extends into the upper shield from the media facing surface.

20 Claims, 11 Drawing Sheets

(56) References Cited

U.S. PATENT DOCUMENTS

| | | |
|---|---|---|
| 6,292,334 B1 | 9/2001 | Koike et al. |
| 6,353,518 B2 | 3/2002 | Pinarbasi |
| 6,425,989 B1 | 7/2002 | Westwood |
| 6,493,195 B1 | 12/2002 | Hayashi et al. |
| 6,542,340 B1 | 4/2003 | Hayashi |
| 6,580,586 B1 | 6/2003 | Biskeborn |
| 6,680,832 B2 | 1/2004 | Fontana, Jr. et al. |
| 6,729,014 B2 | 5/2004 | Lin et al. |
| 6,735,059 B2 | 5/2004 | Sato |
| 6,760,198 B2 | 7/2004 | Jarratt |
| 6,762,912 B2 | 7/2004 | Ma |
| 6,833,979 B1 | 12/2004 | Knapp et al. |
| 6,847,509 B2 | 1/2005 | Yoshikawa et al. |
| 6,980,403 B2 | 12/2005 | Hasegawa |
| 7,031,119 B2 | 4/2006 | Watanabe et al. |
| 7,035,058 B2 | 4/2006 | Hosomi |
| 7,057,864 B2 | 6/2006 | Gill |
| 7,280,321 B2 | 10/2007 | Watanabe et al. |
| 7,352,539 B2 | 4/2008 | Sato et al. |
| 7,382,589 B2 | 6/2008 | Lin et al. |
| 7,551,409 B2 | 6/2009 | Carey et al. |
| 7,601,610 B2 | 10/2009 | Arena et al. |
| 7,639,457 B1 | 12/2009 | Chen et al. |
| 7,715,156 B2 | 5/2010 | Grata et al. |
| 7,751,154 B2 | 7/2010 | Wu |
| 7,773,349 B2 | 8/2010 | Beach et al. |
| 7,933,100 B2 | 4/2011 | Nakabayashi et al. |
| 8,081,398 B2 | 12/2011 | Hachisuka |
| 8,218,270 B1 | 7/2012 | Zeltser et al. |
| 8,238,057 B2 | 8/2012 | Ito et al. |
| 8,333,898 B2 | 12/2012 | Brown et al. |
| 8,335,056 B2 | 12/2012 | Balamane et al. |
| 8,470,463 B2 | 6/2013 | Wessel et al. |
| 8,514,526 B2 | 8/2013 | Ito et al. |
| 8,531,801 B1 | 9/2013 | Xiao et al. |
| 8,576,518 B1 | 11/2013 | Zeltser et al. |
| 8,582,249 B2 | 11/2013 | Sapozhnikov et al. |
| 8,638,530 B1 | 1/2014 | Hsu et al. |
| 8,675,315 B2 | 3/2014 | Scholz et al. |
| 8,760,819 B1 | 6/2014 | Liu et al. |
| 8,780,505 B1 | 7/2014 | Xiao |
| 8,797,692 B1 | 8/2014 | Guo et al. |
| 8,804,287 B2 | 8/2014 | Araki et al. |
| 8,830,635 B2 | 9/2014 | Watanabe et al. |
| 8,873,204 B1 | 10/2014 | Gao et al. |
| 8,891,207 B1 | 11/2014 | Li et al. |
| 8,908,333 B1 | 12/2014 | Rudy et al. |
| 8,941,954 B2 | 1/2015 | Le et al. |
| 8,984,739 B2 | 3/2015 | Shimazawa et al. |
| 9,013,836 B1 | 4/2015 | Liu et al. |
| 9,111,550 B1 | 8/2015 | Liu et al. |
| 9,263,068 B1 | 2/2016 | Biskeborn et al. |
| 9,275,666 B1 | 3/2016 | Vanderheyden et al. |
| 9,280,991 B1 | 3/2016 | Biskeborn et al. |
| 9,384,764 B1 | 7/2016 | Biskeborn et al. |
| 9,406,319 B1 | 8/2016 | Biskeborn et al. |
| 9,412,400 B2 | 8/2016 | Xiao et al. |
| 9,437,225 B2 | 9/2016 | Quan et al. |
| 9,607,635 B1 | 3/2017 | Biskeborn et al. |
| 9,747,931 B1* | 8/2017 | Biskeborn ............ G11B 5/3912 |
| 9,767,830 B2 | 9/2017 | Biskeborn et al. |
| 9,779,767 B2 | 10/2017 | Biskeborn et al. |
| 9,892,747 B2* | 2/2018 | Biskeborn ............ G11B 5/3106 |
| 9,947,348 B1 | 4/2018 | Biskeborn et al. |
| 9,997,180 B1 | 6/2018 | Biskeborn et al. |
| 10,014,015 B2* | 7/2018 | Biskeborn ............ G11B 5/3906 |
| 10,054,649 B2 | 8/2018 | Singleton et al. |
| 10,115,417 B2 | 10/2018 | Biskeborn et al. |
| 10,297,278 B2 | 5/2019 | Araki et al. |
| 10,332,550 B2* | 6/2019 | Biskeborn ............ G11B 5/3912 |
| 10,360,933 B2* | 7/2019 | Biskeborn ............ G11B 5/3909 |
| 10,388,308 B2* | 8/2019 | Biskeborn ............ G11B 5/398 |
| 2002/0064002 A1 | 5/2002 | Gill |
| 2002/0154458 A1 | 10/2002 | Lin et al. |
| 2002/0186514 A1 | 12/2002 | Childress et al. |
| 2003/0011944 A1 | 1/2003 | Hosomi |
| 2004/0057162 A1 | 3/2004 | Gill |
| 2004/0218313 A1 | 11/2004 | Suda |
| 2007/0047146 A1 | 3/2007 | Biskeborn et al. |
| 2007/0195467 A1 | 8/2007 | Gill |
| 2007/0230062 A1 | 10/2007 | Maejima et al. |
| 2008/0117553 A1 | 5/2008 | Carey et al. |
| 2008/0151438 A1 | 6/2008 | Tanaka et al. |
| 2008/0170335 A1 | 7/2008 | Iben et al. |
| 2009/0040661 A1 | 2/2009 | Tanaka et al. |
| 2009/0273857 A1 | 11/2009 | Iben et al. |
| 2010/0103563 A1 | 4/2010 | Machita et al. |
| 2011/0019313 A1 | 1/2011 | Brown et al. |
| 2011/0026168 A1 | 2/2011 | Carey et al. |
| 2011/0051291 A1 | 3/2011 | Miyauchi et al. |
| 2011/0069417 A1 | 3/2011 | Kawamori et al. |
| 2011/0085261 A1 | 4/2011 | Ito et al. |
| 2012/0050919 A1 | 3/2012 | Brown et al. |
| 2012/0063034 A1 | 3/2012 | Hsu et al. |
| 2012/0281319 A1 | 11/2012 | Singleton et al. |
| 2014/0022668 A1 | 1/2014 | Takagishi et al. |
| 2015/0036246 A1* | 2/2015 | McNeill ................ G11B 5/11 360/319 |
| 2015/0138673 A1 | 5/2015 | Adrong et al. |
| 2015/0170686 A1* | 6/2015 | Singleton ............ G11B 5/3916 360/319 |
| 2015/0248903 A1 | 9/2015 | Aoyama et al. |
| 2016/0133282 A1 | 5/2016 | Biskeborn et al. |
| 2016/0379674 A1 | 12/2016 | Biskeborn et al. |
| 2016/0379675 A1 | 12/2016 | Biskeborn et al. |
| 2017/0025148 A1 | 1/2017 | Boyd |
| 2017/0309302 A1 | 10/2017 | Biskeborn et al. |
| 2018/0068682 A1 | 3/2018 | Biskeborn et al. |
| 2018/0277148 A1 | 9/2018 | Biskeborn et al. |
| 2020/0066301 A1* | 2/2020 | Sapozhnikov ............ G11B 5/11 |

FOREIGN PATENT DOCUMENTS

| | | |
|---|---|---|
| EP | 2320489 B1 | 5/2014 |
| GB | 2387711 A | 10/2003 |
| JP | 2006134388 A | 5/2006 |
| WO | 9839102 A1 | 9/1998 |

OTHER PUBLICATIONS

Biskeborn et al., U.S. Appl. No. 16/282,062, filed Feb. 21, 2019.
Non-Final Office Action from U.S. Appl. No. 16/282,062, dated Sep. 26, 2019.
Final Office Action from U.S. Appl. No. 16/282,062, dated Mar. 26, 2020.
Childress et al., "Magnetic recording read head sensor technology," Science direct, Comptes Rendus Physique, vol. 6, Issue 9, Nov. 2005, pp. 997-1012.
Biskeborn et al., U.S. Appl. No. 15/466,540, filed Mar. 22, 2017.
Biskeborn et al., U.S. Appl. No. 15/963,022, filed Apr. 25, 2018.
Kim et al., "Characterization of an AlOx Tunneling Barrier in a Magnetic Tunnel Junction by a Surface Plasmon Resonance Spectroscopy Technique," IEEE Transactions on Magnetics, vol. 45, No. 1, Jan. 2009, pp. 60-63.
Biskeborn et al., U.S. Appl. No. 15/136,759, filed Apr. 22, 2016.
Biskeborn et al., U.S. Appl. No. 15/422,322, filed Feb. 1, 2017.
Biskeborn et al., U.S. Appl. No. 15/812,871, filed Nov. 14, 2017.
Seagle et al., U.S. Appl. No. 16/879,594, filed May 20, 2020.
Biskeborn et al., "TMR tape drive for a 15 TB cartridge," AIP Advances, vol. 8, 2018, pp. 056511-1-056511-8.

* cited by examiner

READ TRANSDUCER STRUCTURE HAVING AN EMBEDDED WEAR LAYER BETWEEN THIN AND THICK SHIELD PORTIONS

BACKGROUND

The present invention relates to data storage systems, and more particularly, this invention relates to magnetic heads, e.g., magnetic tape heads, which include current-perpendicular-to-plane (CPP) reader transducers having hard spacers incorporated therewith.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

Tunneling magnetoresistive (TMR) readers are susceptible to scratching caused by contact with asperities fixed on moving magnetic medium surfaces. Friction between asperities on the tape and the ductile metallic films in the sensor gives rise to deformation forces in the direction of tape motion. As a result, an electrical short is often created by the scratching and/or smearing of conductive material across the layers, which has a net effect of creating bridges of conductive material across the sensor. Particularly, particles protruding from the medium tend to plow through ductile magnetic material, e.g., from one or both shields, smearing the metal across the insulating material of the sensor, and thereby creating an electrical short that reduces the effective resistance of the sensor and diminishes the sensitivity of the sensor as a whole. Deep scratches may result in electrical shorting due to abrasive lapping particles that scratch or smear conductive material across the insulating materials separating the conductive leads, e.g., opposing shields, which allow sense (bias) current to flow through the sensor and magnetic head as a whole. The scratches may result in a loss of amplitude and inability to read the data track.

SUMMARY

An apparatus, according to one aspect, includes a read transducer structure having a media facing surface. The read transducer structure has a lower shield, and an upper shield formed above the lower shield. The upper and lower shields providing magnetic shielding. A current-perpendicular-to-plane sensor is positioned between the upper and lower shields. A dielectric layer extends into one of the shields from the media facing surface.

In a preferred approach, the dielectric layer is present in the upper shield, and a second dielectric layer is present in the lower shield.

The dielectric layer(s) preferably extend into the respective shield for a distance that is less than a height of the respective shield, thereby enabling magnetic continuity of all portions of the respective shield.

Such structures are especially beneficial when the sensor is a tunneling magnetoresistive data sensor, as they are resistant to shorting.

In some approaches, an electrical lead layer and dielectric layer are present between the sensor and each shield, thereby enhancing reliability by providing protection against shorting for bi-directional tape operation.

The aforementioned enhanced reliability also enables minimal recession of the current-perpendicular-to-plane sensor from the plane of the media facing surface of the module, and consequently less spacing loss when reading data tracks. For example, the recession of the current-perpendicular-to-plane sensor from the plane is about 5 nm or less in some approaches.

Any of these approaches may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several configurations of magnetic storage systems having one or more modules which implement CPP sensors such as TMR tunnel valve transducers, and new shield structures having dielectric layers therein that reduce the probability of sensor shorting for CPP sensors, e.g., such as TMR reader sensors, giant magnetoresistive (GMR) reader sensors, etc., as will be described in further detail below.

In one general approach, an apparatus includes a read transducer structure having a media facing surface. The read transducer structure has a lower shield, and an upper shield formed above the lower shield. The upper and lower shields providing magnetic shielding. A current-perpendicular-to-plane sensor is positioned between the upper and lower shields. A dielectric layer extends into one of the shields from the media facing surface. The dielectric layer extends into the one of the shields for a distance that is less than a height of the one of the shields.

In another general approach, an apparatus includes a read transducer structure having a media facing surface. The read transducer structure has a lower shield and an upper shield formed above the lower shield, the upper and lower shields providing magnetic shielding. A current-perpendicular-to-plane sensor is positioned between the upper and lower shields. A first dielectric layer extends into the lower shield from the media facing surface. A second dielectric layer extends into the upper shield from the media facing surface.

Figure 1A:
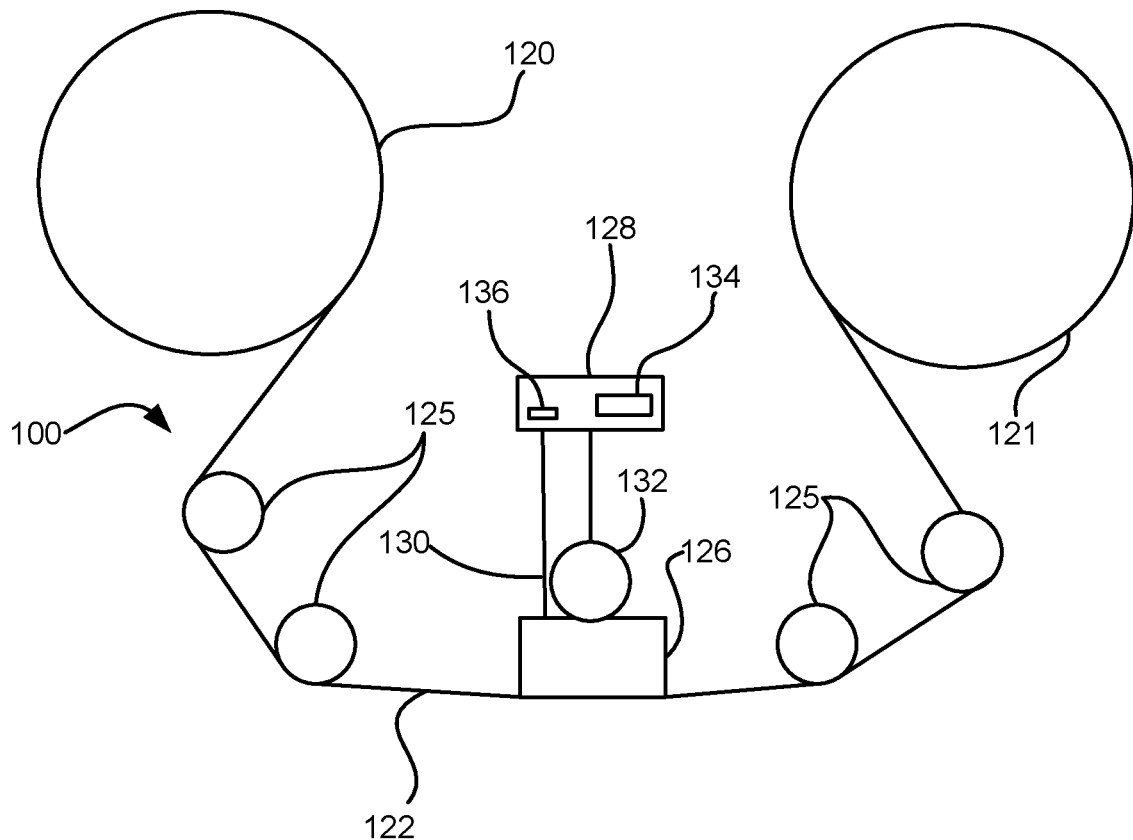
FIG. 1A is a schematic diagram of a simplified tape drive system according to one approach.

FIG. 1A illustrates a simplified tape drive 100 of a tape-based data storage system, which may be employed in the context of the present invention. While one specific implementation of a tape drive is shown in FIG. 1A, it should be noted that the aspects described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of read transducers (also referred to as readers), write transducers (also known in the art as writers), or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various aspects. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
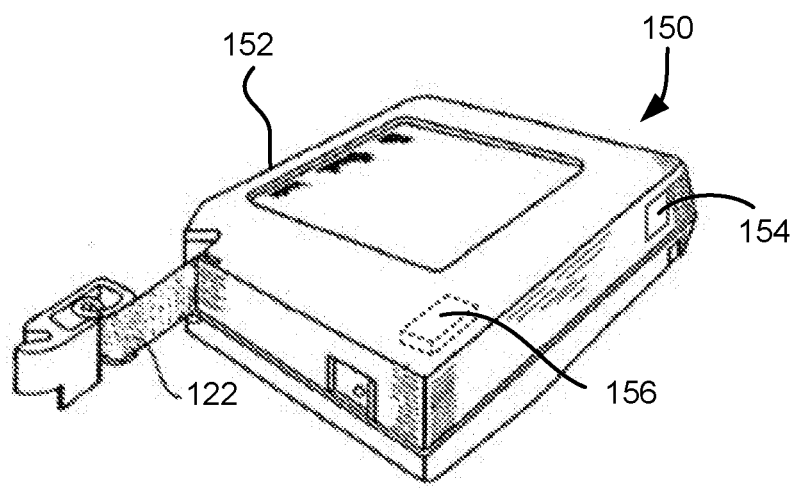
FIG. 1B is a schematic diagram of a tape cartridge according to one approach.

FIG. 1B illustrates an exemplary tape cartridge 150 according to one aspect. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
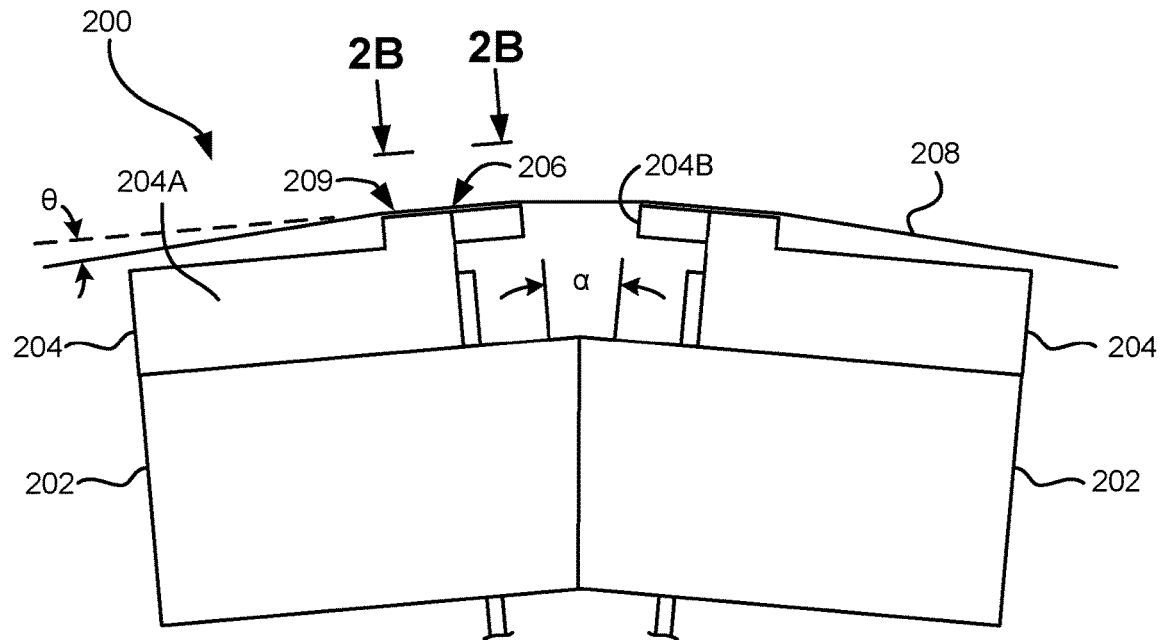
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2B:
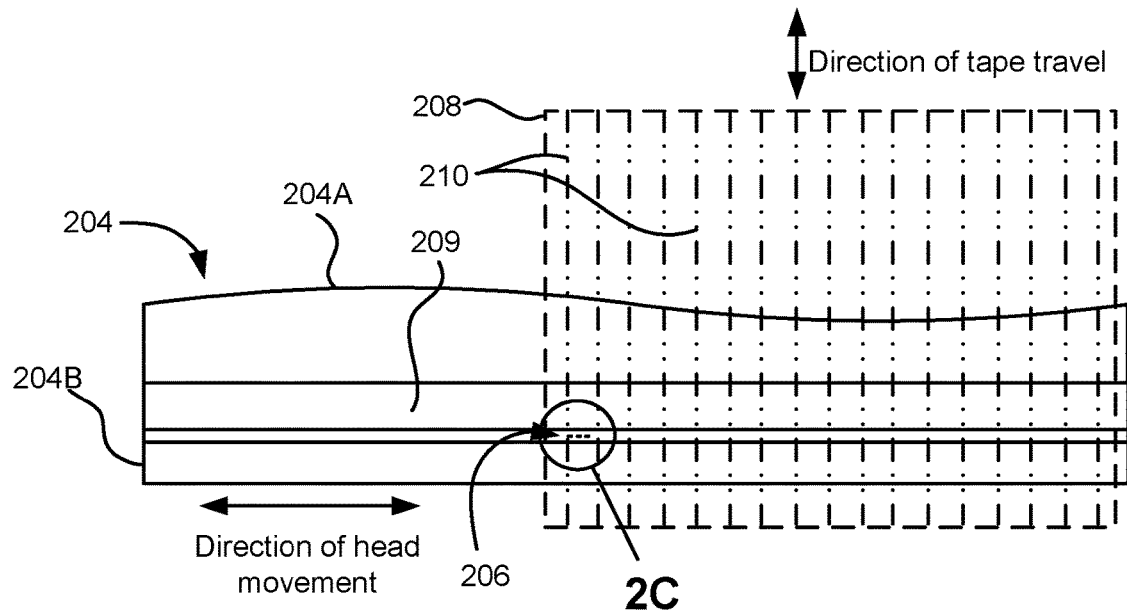
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2C:
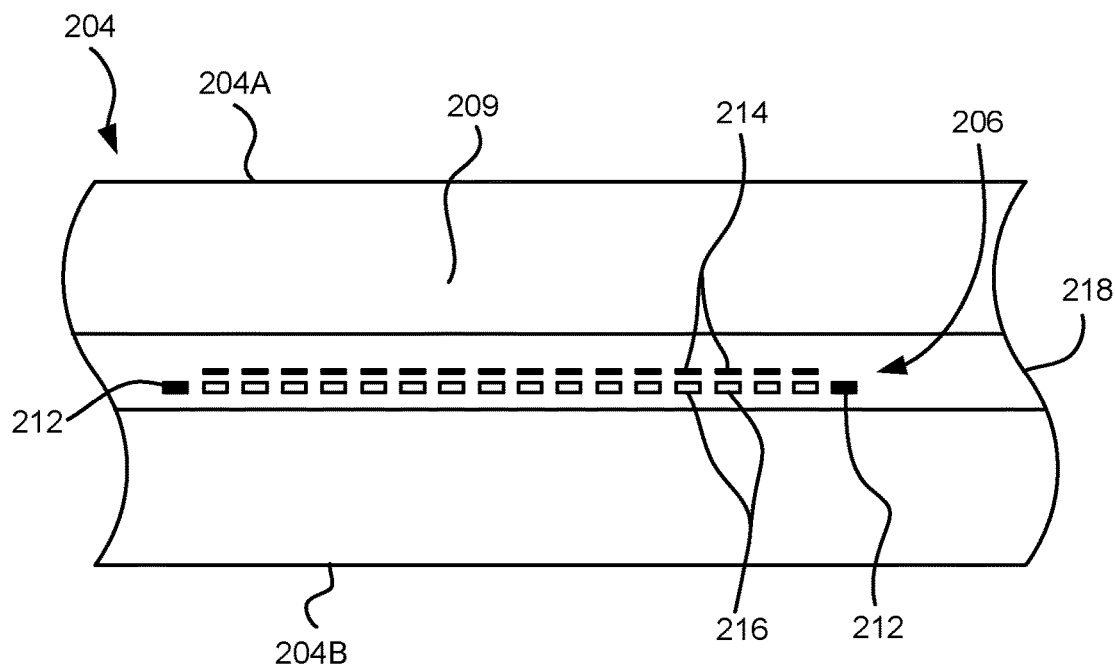
FIG. 2C is a detailed view taken from Circle 2C of FIG. 2B.

FIG. 2C depicts a plurality of read transducers and/or write transducers 206 formed in a gap 218 on the module 204 in Circle 2C of FIG. 2B. As shown in FIG. 2C, the array of read transducers and write transducers 206 includes, for example, 16 write transducers 214, 16 read transducers 216 and two servo readers 212, though the number of elements may vary. Illustrative approaches include 8, 16, 32, 40, and 64 active read transducers and/or write transducers 206 per array, and alternatively interleaved designs having odd numbers of read transducers or write transducers such as 17, 25, 33, etc. An illustrative approach includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2C, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2A and 2B-2C together, each module 204 may include a complementary set of read transducers and/or write transducers 206 for such things as bi-directional reading and writing, read-while-write capability, backward compatibility, etc.

Figure 2D:
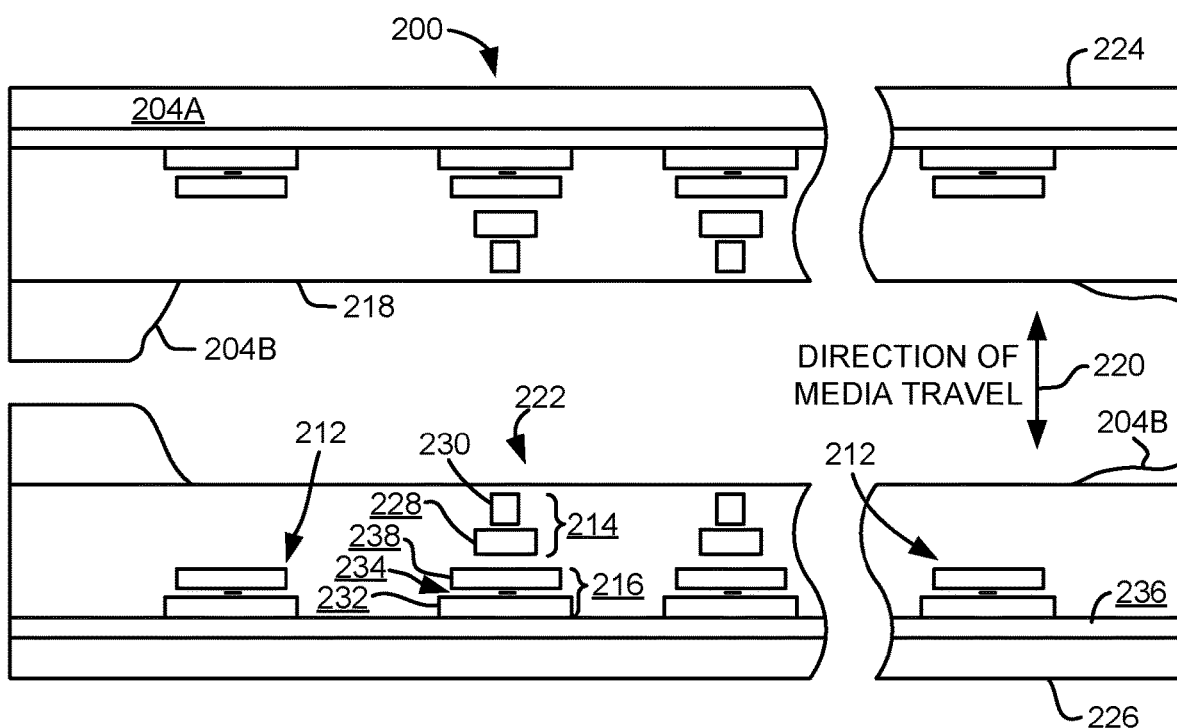
FIG. 2D is a detailed view of a partial tape bearing surface of a pair of modules.

FIG. 2D shows a partial tape bearing surface view of complementary modules of a magnetic tape head 200 according to one approach. In this approach, each module has a plurality of read/write (R/W) pairs in a piggyback configuration formed on a common substrate 204A and an optional electrically insulative insulating layer 236. The write transducers 214 and the read transducers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
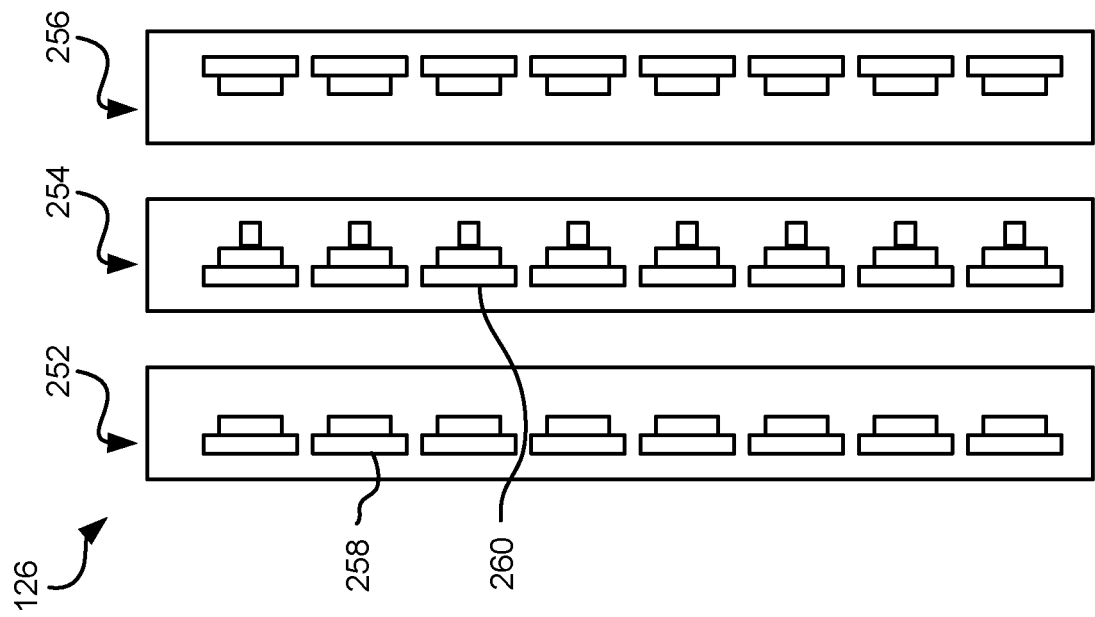
FIG. 4 is a partial tape bearing surface view of a magnetic head having a read-write-read configuration.
Figure 3:
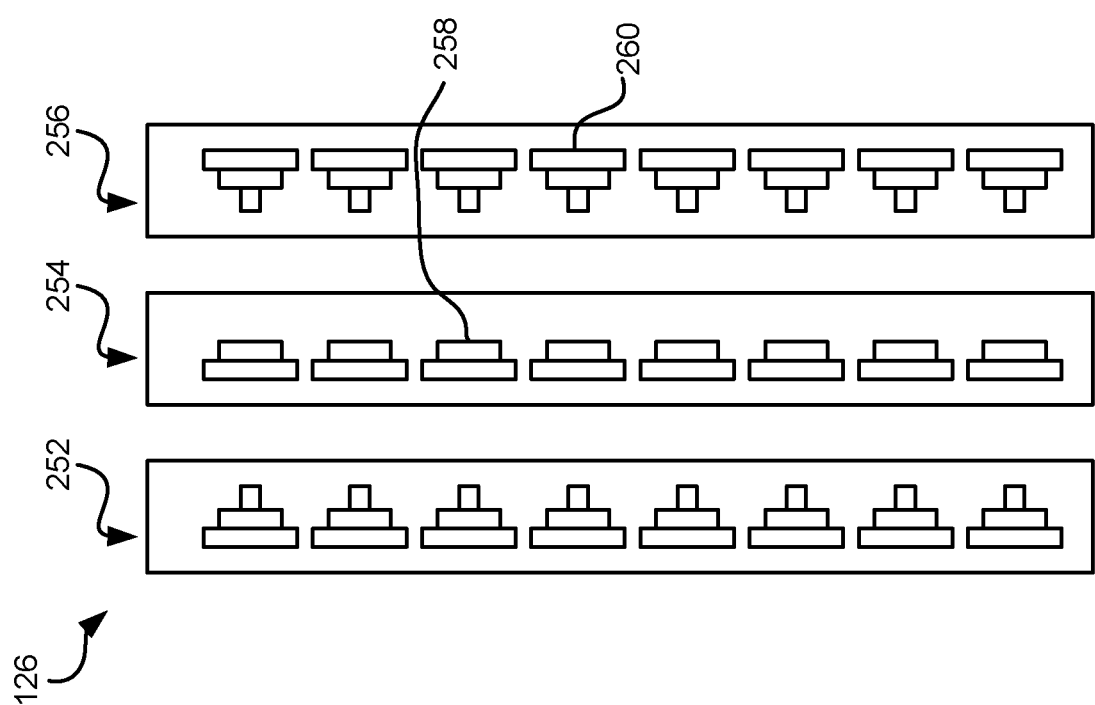
FIG. 3 is a partial tape bearing surface view of a magnetic head having a write-read-write configuration.

The configuration of the tape head 126 according to one approach includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify aspects of the present invention. One skilled in the art apprised with the teachings herein will appreciate how permutations of the present invention would apply to configurations other than a W-R-W configuration.

Figure 5:
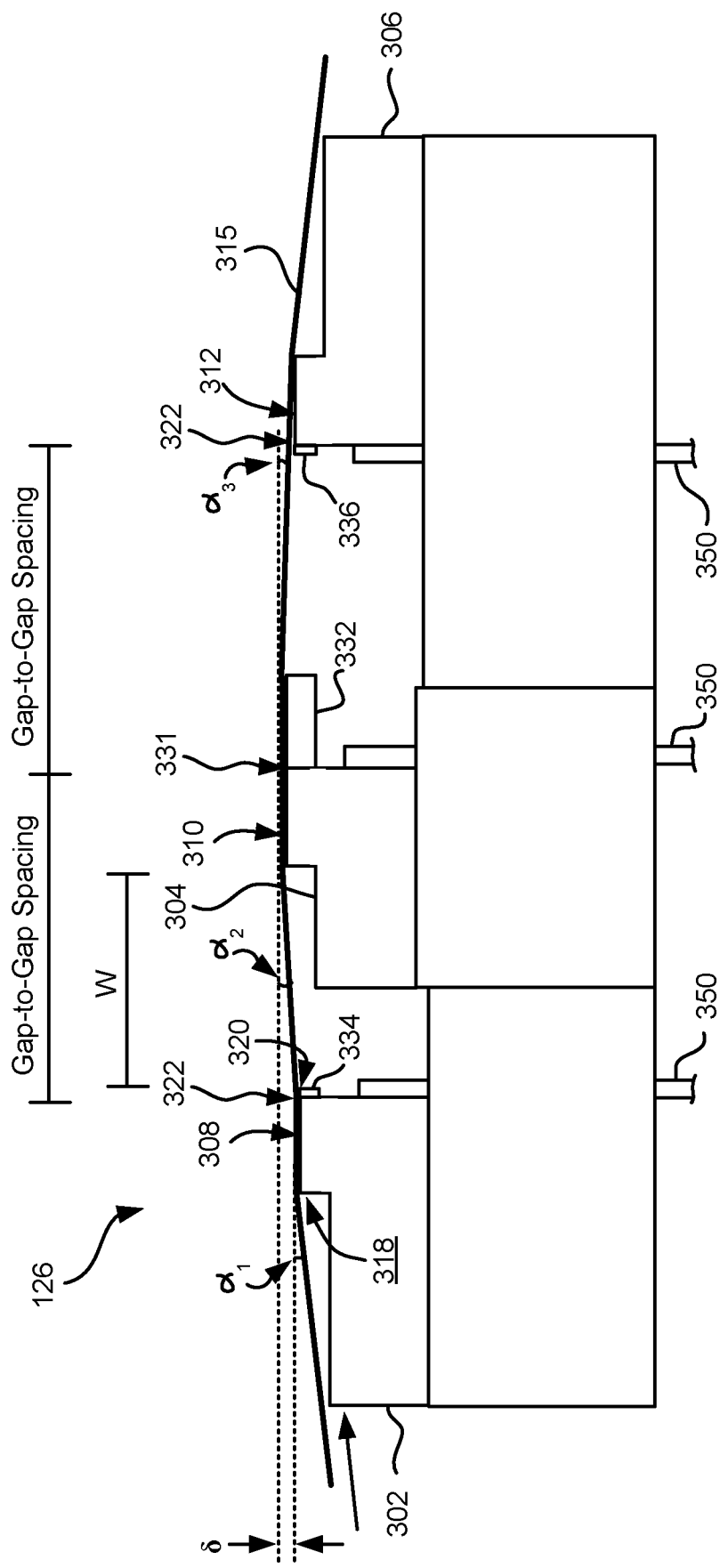
FIG. 5 is a side view of a magnetic tape head with three modules according to one approach where the modules all generally lie along about parallel planes.

FIG. 5 illustrates a magnetic head 126 according to one approach of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
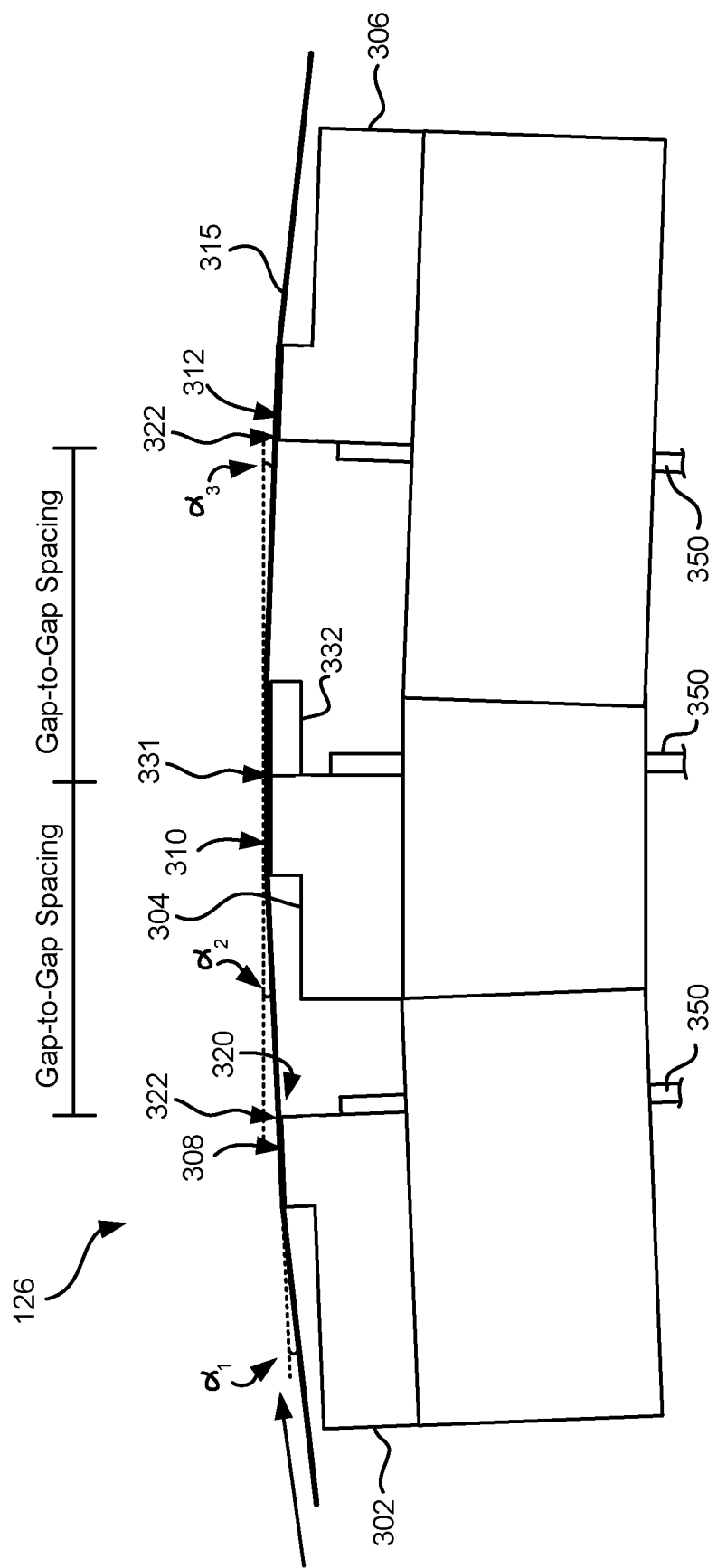
FIG. 6 is a side view of a magnetic tape head with three modules in a tangent (angled) configuration.

In one approach, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These approaches are particularly adapted for write-read-write applications.

A benefit of this and other approaches described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no write transducers. The first and third modules 302, 306 include a plurality of write transducers 322 and no data read transducers, with the exception that the outer modules 302, 306 may include optional servo readers. The servo readers may be used to position the head during reading and/or writing operations. The servo reader(s) on each module are typically located towards the end of the array of read transducers or write transducers.

By having only read transducers or side by side write transducers and servo readers in the gap between the substrate and closure, the gap length can be substantially reduced. Typical heads have piggybacked read transducers and write transducers, where the write transducer is formed above each read transducer. A typical gap is 20-35 microns. However, irregularities on the tape may tend to droop into the gap and create gap erosion. Thus, the smaller the gap is the better. The smaller gap enabled herein exhibits fewer wear related problems.

In some approaches, the second module 304 has a closure, while the first and third modules 302, 306 do not have a closure. Where there is no closure, preferably a hard coating is added to the module. One preferred coating is diamond-like carbon (DLC).

In the approach shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some aspects is ideal for stabilizing tape motion over the second module 304.

Depending on tape tension and stiffness, it may be desirable to angle the tape bearing surfaces of the outer modules relative to the tape bearing surface of the second module. FIG. 6 illustrates an approach where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the approaches shown in FIGS. 5 and 6.

Figure 7:
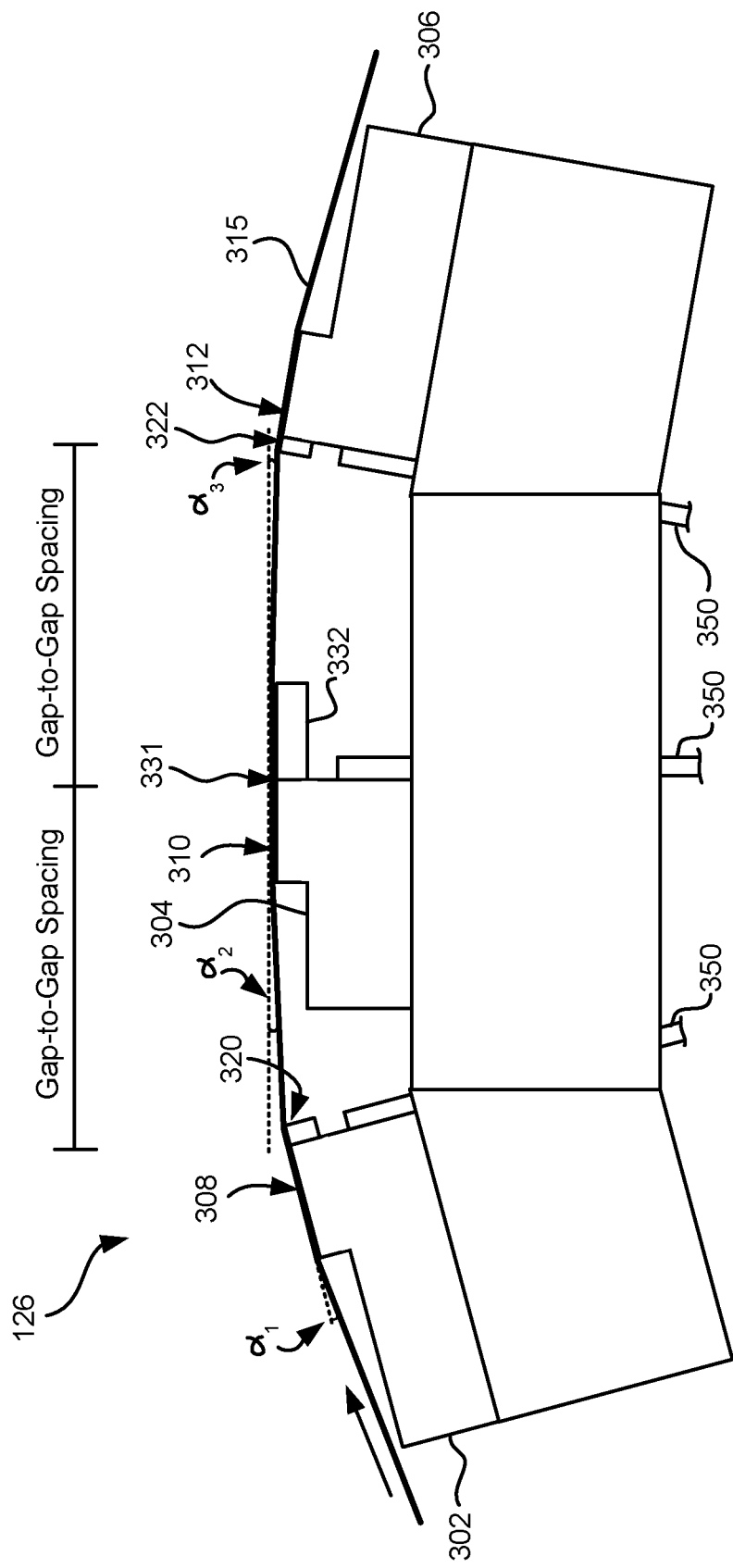
FIG. 7 is a side view of a magnetic tape head with three modules in an overwrap configuration.

FIG. 7 illustrates an approach where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this approach, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may require a wider gap-to-gap separation. Therefore, a preferred approach has a write-read-write configuration, which may use shortened closures that thus allow closer gap-to-gap separation.

Additional aspects of the approaches shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the write transducers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various approaches in conformance with the teachings herein, as would become apparent to one skilled in the art upon reading the present disclosure.

Figure 8A:
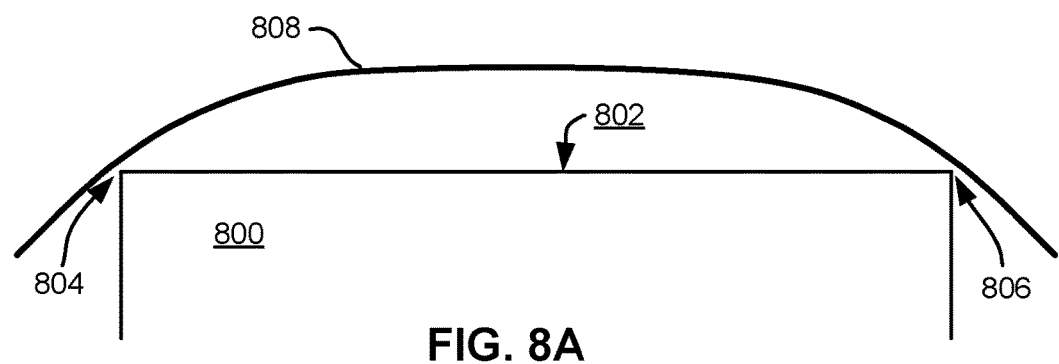
FIGS. 8A-8C are schematics depicting the principles of tape tenting.
Figure 8B:
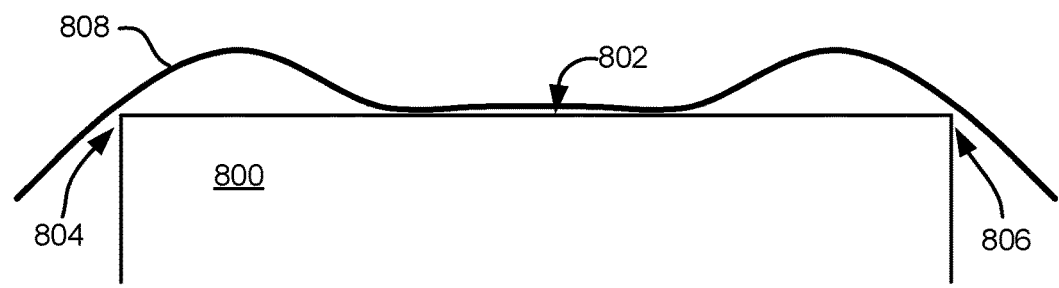
Figure 8C:
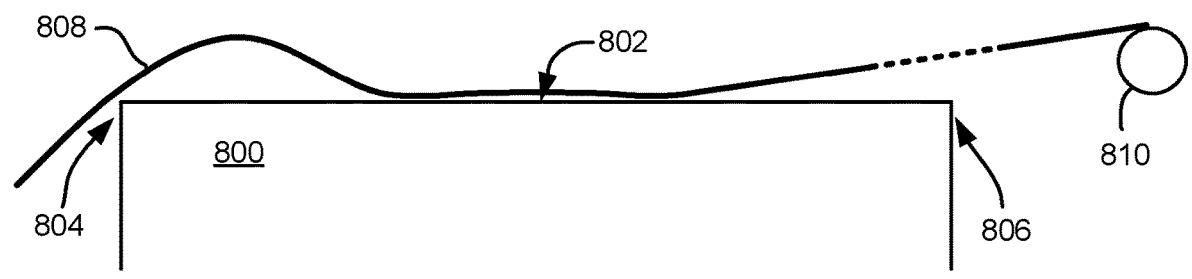

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various aspects herein can be implemented with a wide range of file system formats, including for example IBM® Spectrum® Archive Library Edition (LTFS LE) (IBM and all IBM-based trademarks and logos are trademarks or registered trademarks of International Business Machines Corporation and/or its affiliates). However, to provide a context, and solely to assist the reader, some of the approaches below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
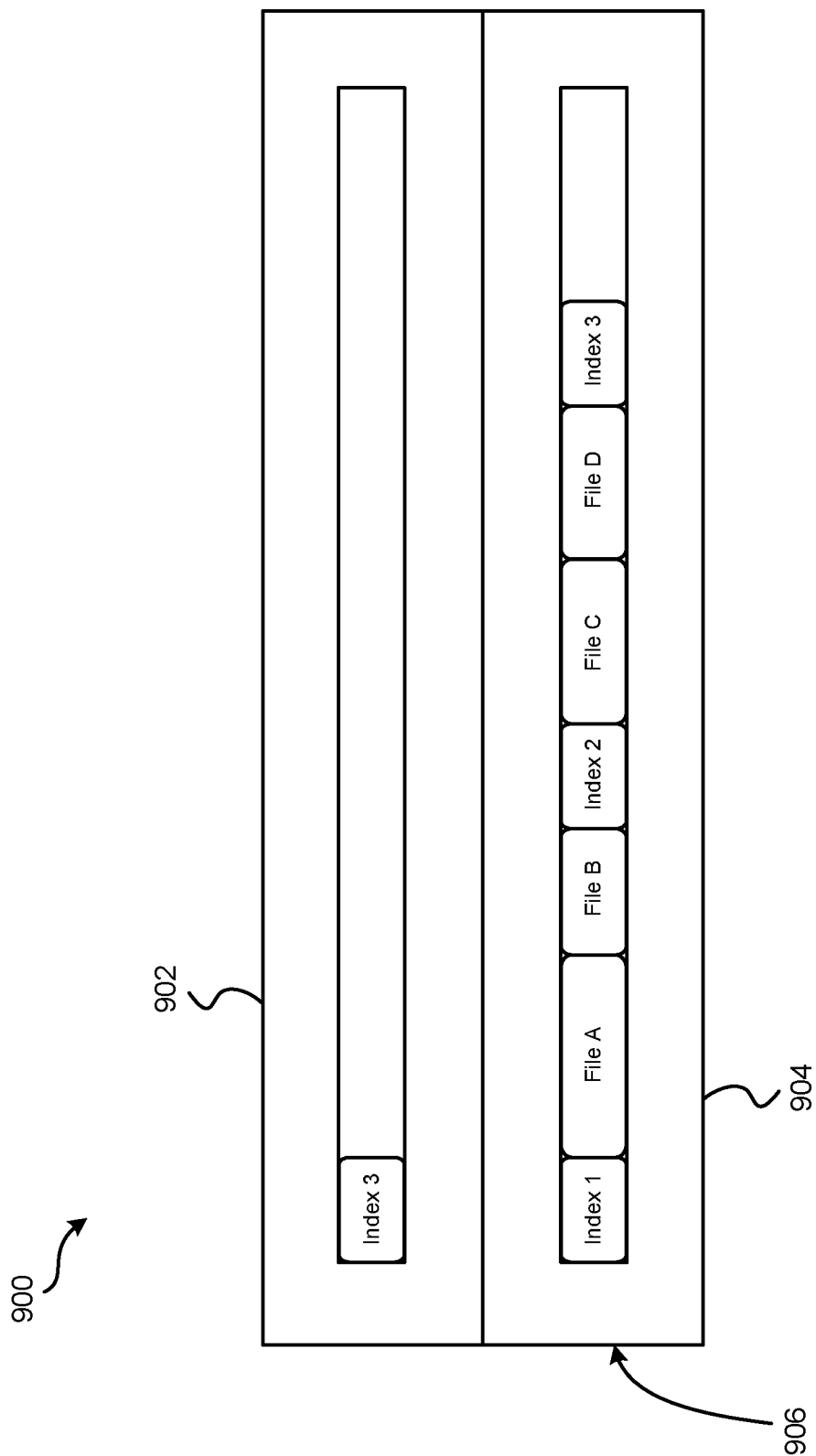
FIG. 9 is a representational diagram of files and indexes stored on a magnetic tape according to one approach.

Looking to FIG. 9, a magnetic tape 900 having an index partition 902 and a data partition 904 is illustrated according to one approach. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired approach. According to some approaches, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As will be appreciated by one skilled in the art, by way of example, TMR is a magnetoresistive effect that occurs with a magnetic tunnel junction. TMR sensors typically include two ferromagnetic layers separated by a thin insulating barrier layer. If the barrier layer is thin enough e.g., less than about 15 angstroms, electrons can tunnel from one ferromagnetic layer to the other ferromagnetic layer, passing through the insulating material and thereby creating a current. Variations in the current, caused by the influence of external magnetic fields from a magnetic medium on the free ferromagnetic layer of the TMR sensor, correspond to data stored on the magnetic medium.

It is well known that TMR and other CPP MR sensors are particularly susceptible to shorting during fabrication due to abrasive lapping particles that scratch or smear conductive material across the insulating materials separating the conductive leads, e.g., opposing shields, which allow sense (bias) current to flow through the sensor and magnetic head as a whole. Friction between asperities on the tape and the ductile metallic films in the sensor gives rise to deformation forces in the direction of tape motion. As a result, an electrical short is created by the scratching and/or smearing across the layers which has a net effect of creating bridges of conductive material across the sensor. Particularly, the lapping particles tend to plow through ductile magnetic material, e.g., from one or both shields, smearing the metal across the insulating material, and thereby creating an electrical short that reduces the effective resistance of the sensor and diminishes the sensitivity of the sensor as a whole.

Scientists and engineers familiar with tape recording technology would not expect a CPP MR sensor to remain operable (e.g., by not experiencing shorting) in a contact recording environment such as tape data storage, because of the near certain probability that abrasive asperities embedded in the recording medium will scrape across the thin insulating layer during tape travel, thereby creating the aforementioned shorting.

Typical CPP MR sensors such as TMR sensors in hard disk drive applications are configured to be in electrical contact with the top and bottom shields of read head structures. In such configurations the current flow is constrained to traveling between the top shield and the bottom shield through the sensor, by an insulator layer with a thickness of about 3 to about 100 nanometers (nm). This insulator layer extends below the hard bias magnet layer to insulate the bottom of the hard bias magnet from the bottom shield/lead layers, and isolates the edges of the sensor from the hard bias magnet material. In a tape environment, where the sensor is in contact with the tape media, smearing of the top or bottom shield material can bridge the insulation layer separating the hard bias magnet from the bottom lead and lower shield, thereby shorting the sensor. Further, shield deformation or smearing can create a conductive bridge across a tunnel barrier layer in a TMR sensor. Such tunnel barrier layer may be only 12 angstroms wide or less.

In disk drives, conventional CPP MR designs are acceptable because there is minimal contact between the head and the media. However, for tape recording, the head and the media are in constant contact. Head coating has been cited as a possible solution to these shorting issues; however, tape particles and asperities have been known to scratch through and/or wear away these coating materials as well. Furthermore, conventional magnetic recording head coatings are not available for protecting against defects during lapping processes, as the coating is applied after these process steps. Because the insulating layers of a conventional CPP MR reader sensor are significantly thin, the propensity for electrical shorting due, e.g., to scratches, material deposits, surface defects, films deformation, etc., is high. Approaches described herein implement novel dielectric layers in combination with TMR read transducer sensors. As a result, some of the approaches described herein may be able to reduce the probability of, or even prevent, shorting in the most common areas where shorting has been observed, e.g. the relatively larger areas on opposite sides of the sensor between the shields.

The potential use of CPP MR reader sensors in tape heads has heretofore been thought to be highly undesirable, as tape heads include multiple sensors, e.g., 16, 32, 64, etc., on a single die. Thus, if one or more of those sensors become inoperable due to the aforementioned shorting, the entire head becomes defective and typically would need to be discarded and/or replaced for proper operation of the apparatus.

Conventional current in-plane type sensors require at least two shorting events across different parts of the sensor in order to affect the sensor output, and therefore such heads are far less susceptible to shorting due to scratches. In contrast, tape heads with CPP MR reader sensors may short with a single event, which is another reason that CPP MR reader sensors have not been adopted into contact recording systems.

Various approaches described herein comprise a module having scratch resilient TMR readers. In some approaches, the TMR readers are slightly prerecessed from the plane.

Some of the approaches described herein include spacer layers as gap liners which are preferably in close proximity to the sensing structure, thereby resisting deformation and thereby the previously experienced shorting as well, as will be described in further detail below.

Figure 10:
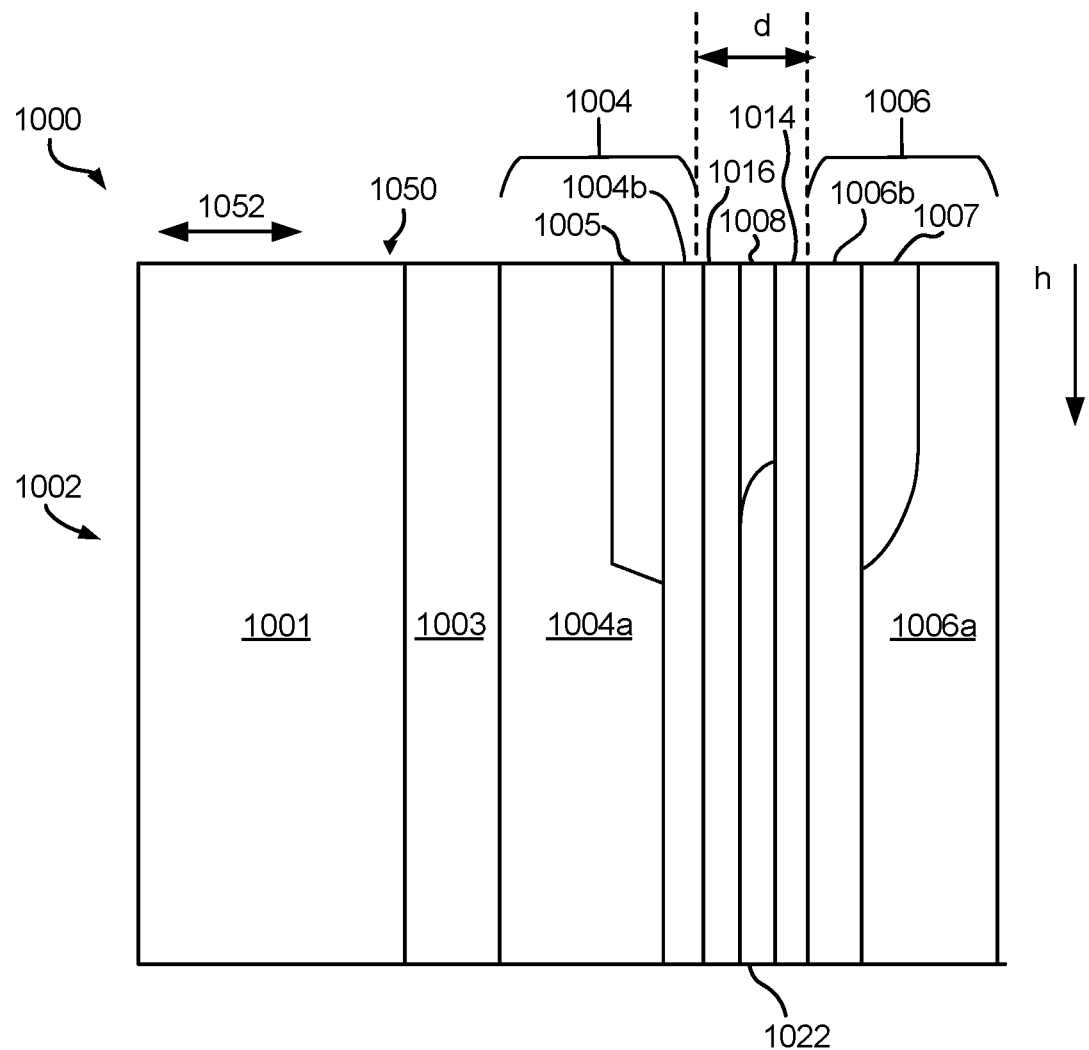
FIG. 10 is a partial cross-sectional view of a media facing side of a read transducer structure according to one approach.

FIG. 10 depicts an apparatus 1000, in accordance with one approach. As an option, the present apparatus 1000 may be implemented in conjunction with features from any other approach listed herein, such as those described with reference to the other FIGS. However, such apparatus 1000 and others presented herein may be used in various applications and/or in permutations which may or may not be specifically described in the illustrative approaches listed herein. Further, the apparatus 1000 presented herein may be used in any desired environment. Thus FIG. 10 (and the other FIGS.) may be deemed to include any possible permutation.

Looking to FIG. 10, apparatus 1000 includes a read transducer structure 1002. The read transducer structure 1002 may include a lower shield 1004 above a wafer 1001 and optional undercoat 1003. Moreover, the read transducer structure 1002 may include an upper shield 1006 positioned above the lower shield 1004 (e.g., in a deposition direction thereof).

A CPP sensor 1008 (e.g. such as a TMR sensor, GMR sensor, etc.) is positioned between the upper and lower shields 1006, 1004. In a preferred configuration, the CPP sensor 1008 is a tunneling magnetoresistive sensor. As would be appreciated by one skilled in the art upon reading the present descriptions, according to preferred approaches, the upper and lower shields 1006, 1004 provide magnetic shielding for the CPP sensor 1008. Thus, according to various approaches, one or both of the upper and lower shields 1006, 1004 may desirably include a magnetic material of a type known in the art. It should be noted that in such approaches, the material of the upper and lower shields 1006, 1004 may vary, or alternatively be the same.

To reduce the probability of shorting due to conductive material from a shield 1006, 1004 being smeared across the media facing surface 1050, a dielectric layer 1005 may extend into the lower shield 1004, a dielectric layer 1007 may extend into the upper shield 1006, or preferably both as shown in FIG. 10.

Use of the dielectric layers 1005, 1007 increases resilience of the read transducer structure 1002 against shorting due to material smearing, while allowing for scaling of the read gap as desired.

As illustrated in FIG. 10, the dielectric layers 1005, 1007 are positioned at the media facing surface 1050 of the read transducer structure 1002, e.g., such that the media facing end of each shield is separated into two portions at the media facing surface 1050, and the sensor 1008 and/or electrical lead layers 1010, 1012 (see FIG. 11) are separated from the larger portion of the upper and lower shields 1006, 1004, thereby reducing the chance of a shorting event occurring. Moreover, it is preferred that the material composition of the dielectric layers 1005, 1007 is sufficiently resistant to damage by asperities in a recording medium passing thereacross. Thus, the dielectric layers 1005, 1007 are preferably hard, e.g., at least hard enough to help prevent asperities in a tape passing over the read transducer structure 1002 from causing deformations in the media facing surface 1050 of the read transducer structure 1002 which affect the performance of the sensor 1008.

In preferred approaches, the dielectric layers 1005, 1007 include aluminum oxide. Without wishing to be bound by any theory, it is believed that the improved performance provided by aluminum oxide dielectric layers 1005, 1007 extending into the shields may be due to low ductility of alumina, relatively high hardness, and low friction resulting between the aluminum oxide dielectric layers and defects (e.g., asperities) on a magnetic tape being passed thereover.

Thus, in an exemplary approach, one or both of the dielectric layers 1005, 1007 may include an aluminum oxide which is preferably amorphous. Moreover, an amorphous aluminum oxide dielectric layer may be formed using sputtering, atomic layer deposition, etc., or other processes which would be appreciated by one skilled in the art upon reading the present description. According to another exemplary approach, the upper and/or lower dielectric layers may include an at least partially polycrystalline aluminum oxide.

According to various alternate approaches, the dielectric layers 1005, 1007 may include at least one of the following materials: ruthenium oxide, chrome oxide, silicon nitride, boron nitride, silicon carbide, silicon oxide, titanium oxide, titanium nitride, ceramics, etc., and/or combinations thereof. In some approaches, the dielectric layers 1005, 1007 may have the same composition. In other approaches, the dielectric layers 1005, 1007 may have different compositions relative to one another.

In preferred approaches, the dielectric layers 1005, 1007 have a very low ductility, e.g., have a high resistance to bending and deformation in general, and ideally a lower ductility than refractory metals such as Ir, Ta, and Ti.

Illustrative deposition thicknesses of each of the dielectric layers 1005, 1007 are greater than about 50 nm, and preferably greater than 100 nm, e.g., in a range of about 100 nm to about 500 nm.

The height that each dielectric layer 1005, 1007 extends into the associated shield 1004, 1006 in the height h direction is less than a height of the associated shield 1004, 1006 so that portions of the respective shield 1004, 1006 positioned along the media facing surface 1050 remain magnetically coupled together, e.g., via magnetic coupling behind the associated dielectric layer 1005, 1007. The relatively shorter height of each dielectric layer 1005, 1007 also enables electrical coupling of the portions of the respective shield behind the associated dielectric layer 1005, 1007.

The particular height of each dielectric layer 1005, 1007 is not critical. In general, the height should be long enough to prevent the dielectric layers 1005, 1007 from being dislodged upon impact with an asperity. In some approaches, the height of the dielectric layers 1005, 1007 is greater than the stripe height of the sensor 1008.

As shown in FIG. 10, the lower shield 1004 is preferably formed of two layers 1004a, 1004b with the dielectric layer 1005 positioned therebetween. The layers 1004a, 1004b are magnetically coupled to one another behind the dielectric layer 1005. The layers 1004a, 1004b are preferably electrically coupled to one another behind the dielectric layer 1005. The layers 1004a, 1004b may be formed of any conventional magnetic shield material, and may have the same composition as one another, or different compositions. Intervening layers (not shown), such as seed layers, etc., may be present between the layers 1004a, 1004b and or between the dielectric layer 1005 and one or both layers 1004a, 1004b.

As also shown in FIG. 10, the upper shield 1006 is preferably formed of two layers 1006a, 1006b with the dielectric layer 1007 positioned therebetween. The layers 1006a, 1006b are magnetically coupled to one another behind the dielectric layer 1007. The layers 1006a, 1006b are preferably electrically coupled to one another behind the dielectric layer 1005. The layers 1006a, 1006b may be formed of any conventional magnetic shield material, and may have the same composition as one another, or different compositions. Intervening layers (not shown), such as seed layers, etc., may be present between the layers 1006a, 1006b and or between the dielectric layer 1007 and one or both layers 1006a, 1006b.

The larger layers 1004a, 1006a may be formed using any conventional technique, but adapted to form the unique structure disclosed herein. For example, plating is a preferred deposition technique for the larger layers 1004a, 1006a. Sputtering, vapor deposition, etc. may also be used.

The thinner layers 1004b, 1006b may be formed using any conventional technique, but adapted to form the unique structure disclosed herein. For example, sputtering is a preferred deposition technique for the thinner layers 1004b, 1006b. Vapor deposition, etc. may also be used. The deposition thickness of each of the thinner layers 1004b, 1006b is preferably less than about 1000 nm but thick enough to avoid magnetic saturation thereof from the transitions on the media. In order to have acceptable magnetic shielding characteristics, and to avoid magnetic saturation at the shields from the media, the thinner layers 1004b, 1006b should be at least about 35 nm to 40 nm thick. Ideally, the deposition thickness of each of the thinner layers 1004b, 1006b is less than about 250 nm, e.g., in a range of about 35 nm to about 250 nm, more preferably 40 nm to about 100 nm.

The desired gap thickness d as measured between the shields 1004, 1006 may be set by selecting thicknesses of spacer layers 1014, 1016. Lower gap thicknesses d generally correlate to higher linear bit resolutions. However, lowering gap thicknesses d had heretofore exacerbated the shorting issues noted above. The dielectric layers 1005, 1007 provide the desired shorting resistance even with lower gap thicknesses d.

In preferred approaches, both spacer layers 1014, 1016 are electrically conductive. The spacer layers 1014, 1016 may be of conventional design and construction in some approaches. In preferred approaches, the spacer layers 1014, 1016 have a very low ductility, e.g., have a high resistance to bending and deformation in general, and ideally a lower ductility than refractory metals Ir, Ta, and Ti.

Accordingly, the spacer layers 1014, 1016 may function as the leads for the CPP sensor 1008 in some approaches, and thus other lead layers are not present in various aspects.

One or both spacer layers 1014, 1016 are dielectric in other approaches. This further assists in ameliorating the shorting problems mentioned above. Thus, lead layers 1010, 1012 may be present, as described in more detail below.

Figure 11:
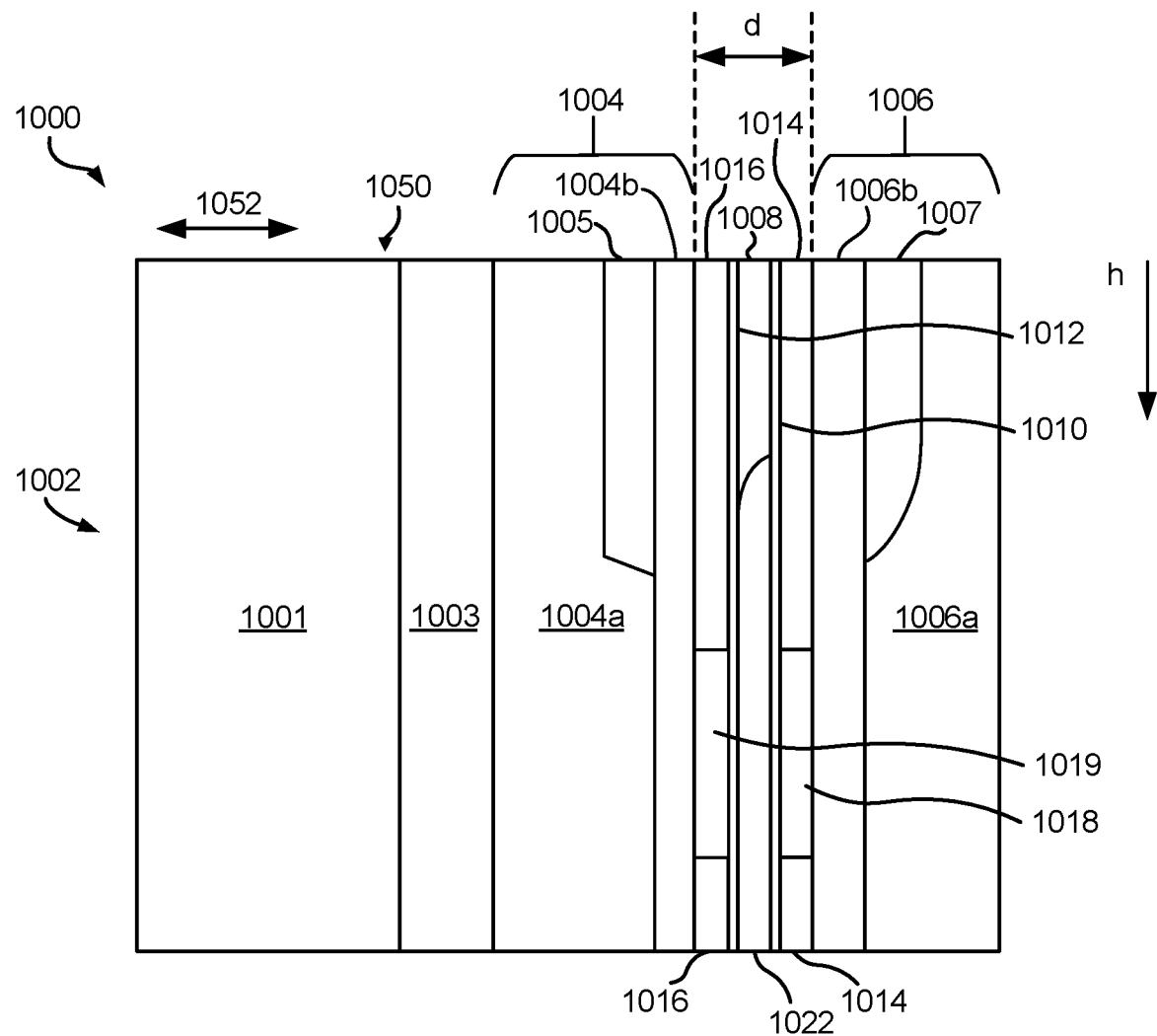
FIG. 11 is a partial cross-sectional view of a media facing side of a read transducer structure according to one approach.

FIG. 11 depicts the apparatus 1000 of FIG. 10 with the inclusion of lead layers 1010, 1012, in accordance with one approach. As an option, the present apparatus 1000 may be implemented in conjunction with features from any other approach listed herein, such as those described with reference to the other FIGS. However, such apparatus 1000 and others presented herein may be used in various applications and/or in permutations which may or may not be specifically described in the illustrative approaches listed herein. Further, the apparatus 1000 presented herein may be used in any desired environment. Thus FIG. 11 (and the other FIGS.) may be deemed to include any possible permutation.

Lead layers may be provided in some approaches, e.g., such as when the spacer layers 1014, 1016 are dielectric. Accordingly, an upper electrical lead layer 1010 may be positioned between the sensor 1008 and the upper spacer layer 1014. Moreover, a lower electrical lead layer 1012 may be between the sensor and the lower shield 1004 (e.g., the shield closest thereto). The upper and lower electrical lead layers 1010, 1012 are preferably in electrical communication with the sensor 1008, e.g., to enable an electrical current to pass through the sensor 1008. In one approach, an electrical lead layer 1010 or 1012 may be positioned between the sensor and one of the shields, and the electrical lead layer is in electrical communication with the sensor. The electrical lead layer(s) may include a seed layer. Preferably, the seed layer comprises chromium, e.g., elemental chromium, a chromium-containing alloy, etc. Illustrative deposition thicknesses for each lead layer, including the seed layer, is in a range of about 10 nm to about 75 nm, but could be higher or lower.

Upper spacer layer 1014 is positioned such that it is sandwiched between the upper electrical lead layer 1010 and the upper shield 1006 (e.g., the shield closest thereto). Similarly, the lower spacer layer 1016 is positioned between the lower electrical lead layer 1012 and the lower shield 1004 (e.g., the shield closest thereto).

In one approach, the thickness of each spacer layer 1014, 1016 is in the range from about 25 nm to about 100 nm.

Although it is preferred that a spacer layer is included on either side of the sensor 1008 along the intended direction of tape travel 1052, some approaches may only include one spacer layer positioned between one of the leads and the shield closest thereto, such that at least one of the leads, and preferably both leads, are electrically isolated from the shield closest thereto at the tape bearing surface.

As described above, it is not uncommon for tape asperities passing over the sensor to smear the material of an upper or lower shield onto the opposite shield, thereby potentially shorting the sensor. In addition to the beneficial anti-shorting effect of the dielectric layers 1005, 1007, dielectric upper and lower spacer layers 1014, 1016 also reduce the probability of a short occurring. Moreover, because the upper and lower electrical lead layers 1010, 1012 are separated from the upper and lower shields 1006, 1004 at the tape bearing surface by the upper and lower spacer layers 1014, 1016 respectively, the probability of a smear bridging the upper and lower electrical lead layers 1010, 1012 is minimized.

Thus, as illustrated in FIG. 11, it is preferred that the spacer layers 1014, 1016 are positioned at the media facing surface 1050 of the read transducer structure 1002, e.g., such that the sensor 1008 and/or electrical lead layers 1010, 1012 are separated from the upper and lower shields 1006, 1004, thereby reducing the chance of a shorting event occurring. Moreover, it is preferred that the material composition of the spacer layers 1014, 1016 is sufficiently resistant to smearing and/or plowing of conductive material across the sensor 1008. Thus, the spacer layers 1014, 1016 are preferably hard, e.g., at least hard enough to prevent asperities in the tape passing over the read transducer structure 1002 from causing deformations in the media facing surface 1050 of the read transducer structure 1002 which effect the performance of the sensor 1008. In preferred approaches, the spacer layers 1014, 1016 include aluminum oxide. However, according to various approaches, the spacer layers 1014, 1016 may include at least one of the following materials: ruthenium, ruthenium oxide, aluminum oxide, chrome oxide, silicon nitride, boron nitride, silicon carbide, silicon oxide, titanium oxide, titanium nitride, ceramics, etc., and/or combinations thereof. In some approaches, the spacer layers 1014, 1016 may be the same. In other approaches, the spacer layers 1014, 1016 may be different.

Furthermore, in various approaches, the electrical lead layers 1010, 1012 may include any suitable conductive material, e.g., which may include Jr, Cu, Ru, Pt, NiCr, Au, Ag, Ta, Cr, etc.; a sandwiched structure of Ta (e.g. Ta/X/Ta); conductive hard alloys such as titanium nitride, boron nitride, silicon carbide, and the like. In a preferred approach, one or both of the electrical lead layers 1010, 1012 comprise iridium. In some approaches, the electrical lead layers 1010, 1012 be the same. In other approaches, the electrical lead layers 1010, 1012 may be different.

A distance between the upper and lower shields 1006, 1004 along the tape bearing surface is denoted by a distance d. In a preferred approach, the distance between the upper and lower shields 1006, 1004 along the tape bearing surface is less than 200 nm.

Although upper and lower spacer layers 1014, 1016 separate upper and lower electrical lead layers 1010, 1012 from the upper and lower shields 1006, 1004, respectively, at the media facing surface 1050 of the read transducer structure 1002, the upper and/or lower electrical lead layers 1010, 1012 are preferably still in electrical communication with the shield closest thereto.

A module (not shown) having the read transducer structure 1002 depicted in FIGS. 10 and/or 11 may include an array of read transducer structures 1002, which may be for reading data tracks and/or servo tracks.

The read transducer structures 1002 may be configured and/or arranged according to descriptions of readers described elsewhere herein and/or in other FIGS. The tape bearing surface of the module generally extends along the media facing surface 1050 of the substrate and the closure. The current-perpendicular-to-plane sensor 1008 may be recessed from the plane of the media facing surface 1050 of the module in some configurations.

A module (not shown) may include an array of the read transducer structures 1002 thereon, arranged according to descriptions of arrays described elsewhere herein and/or in other FIGS. The sensors 1008 may optionally be recessed from the plane of the media facing surface 1050 of the module by about 5 nm or less.

Approaches which include CPP sensors may include an electrical connection to a magnetic lamination or layer proximate to the sensor, to a spacer layer 1014, 1016 positioned between the sensor structure 1008 depicted in FIGS. 10 and/or 11 and one or both magnetic shields 1004, 1006, and/or to the sensor 1008 itself. For example, such approaches may include an electrical lead proximate to the sensor for enabling current flow through the sensor structure. Such leads may be an extension of a layer itself, or a separately-deposited material. Establishing an electrical connection to a magnetic lamination proximate to the sensor and/or to the spacer itself may create a configuration in which portions of the magnetic shields of an apparatus are not biased or current-carrying e.g. the shields are "floating". In such approaches, the nonmagnetic spacer layer 1014, 1016 included between the sensor structure 1008 and the magnetic shields 1004, 1006 may serve as an electrical lead. These portions may be biased according to various approaches.

The electrical lead layers 1010, 1012, if present, may or may not be in electrical communication with the associated shield. In approaches where the spacer layers 1014, 1016 are insulative, various mechanisms for providing current to the sensor may be implemented. Looking to FIG. 11, upper and lower electrical lead layers 1010, 1012 are in electrical communication with the upper and lower shields 1006, 1004 respectively, by implementing studs 1018, 1019 at a location recessed from the media facing surface 1050.

Studs 1018, 1019 preferably include one or more conductive materials, thereby effectively providing an electrical via through insulative spacer layers 1014, 1016 which allows current to flow between the shields 1006, 1004 and electrical lead layers 1010, 1012, respectively. Thus, although insulative spacer layers 1014, 1016 may separate the shields 1006, 1004 from the electrical lead layers 1010, 1012 and sensor 1008, the studs 1018, 1019 allow current to flow from one shield to the other through the sensor. According to an exemplary in-use approach, which is in no way intended to limit the invention, the read transducer structure 1002 may achieve this functionality by diverting current from lower shield 1004 such that it passes through stud 1019 (the stud closest thereto) and into the lower electrical lead 1012. The current then travels towards the media facing surface 1050 along the lower electrical lead 1012, and preferably passes through the tunneling sensor 1008 near the media facing surface 1050. As will be appreciated by one skilled in the art, the strength of a signal transduced from the magnetic transitions on a magnetic recording medium decreases along the sensor in the height direction (perpendicular to the media facing side). Thus, it is preferred that at least some of the current passes through the sensor 1008 near the media facing surface 1050, e.g., to ensure high sensor output. According to one approach, this may be accomplished by achieving ideally an approximate equipotential along the length of the sensor 1008.

Studs 1018, 1019 preferably have about the same thickness as upper and lower spacer layers 1014, 1016 respectively. Moreover, studs 1018, 1019 are preferably positioned behind or extend past an end of the sensor 1008 which is farthest from the media facing surface 1050.

The electrically conductive lead layer(s) preferably have a higher electrical conductivity than the spacer layer. Thus, the spacer layer in some approaches may be electrically insulating or a poor conductor. This helps ensure that a near equipotential is achieved along the length of the sensor. Also and/or alternatively, the resistance of the electrical lead layer along a direction orthogonal to a media facing surface may be less than a resistance across the sensor along a direction parallel to the media facing surface in some approaches. This also helps ensure that a near equipotential is achieved along the length of the sensor. In further approaches, the product of the spacer layer thickness multiplied by the conductivity of the spacer layer is less than a product of the electrical lead layer thickness multiplied by the conductivity of the electrical lead layer associated with the spacer layer, e.g., positioned on the same side of the sensor therewith.

Achieving near equipotential along the length of the sensor 1008 results in a relatively more uniform current distribution along the length of the sensor 1008 in the height direction. Although equipotential is preferred along the length of the sensor 1008, a 20% or less difference in the voltage drop (or loss) across the sensor 1008 at the media facing surface 1050 compared to the voltage drop across the end of the sensor 1008 farthest from the media facing surface 1050 may be acceptable, e.g., depending on the desired approach. For example, a voltage drop of 1 V across the sensor 1008 at the media facing surface 1050 compared to a voltage drop of 0.8 V across the end of the sensor 1008 farthest from the media facing surface 1050 may be acceptable.

Although the operating voltage may be adjusted in some approaches to compensate for differences in the voltage drop along the length of the sensor 1008 of greater than about 10%, it should be noted that the operating voltage is preferably not increased to a value above a threshold value. In other words, increasing the operating voltage above a threshold value is preferably not used to bolster the voltage drop across the sensor 1008 at the media facing surface 1050 to a desired level (e.g., sensitivity) when a read transducer structure 1002 has a drop of greater than about 10%. The threshold value for the operating voltage of a given approach may be predetermined, calculated in real time, be set in response to a request, etc. According to some approaches, the threshold value for the operating voltage may be determined using breakdown voltage(s) of the read transducer structure 1002 layers, e.g., based on their material composition, dimensions, etc.

In some approaches, differences in resistivity may also be used to minimize the voltage drop along the length of the sensor 1008. In order to ensure that sufficient current passes through the sensor 1008 near the media facing surface 1050, it is preferred that the resistivity of the sensor 1008, as for example due to tunnel barrier resistivity in a TMR, is high relative to the resistivity of the electrical lead layers 1010, 1012. By creating a difference in the relative resistance of the adjacent layers, low voltage drop may desirably be achieved along the height of the sensor 1008.

This relative difference in resistivity values may be achieved by forming the sensor 1008 such that it has a relatively high barrier resistivity, while the electrical lead layers 1010, 1012 may have a higher thickness, thereby resulting in a lower resistance value. It should be noted that the thickness of the electrical lead layers 1010, 1012 is preferably greater than about 5 nm. The bulk resistivity of a given material typically increases as the dimensions of the material decreases. As will be appreciated by one skilled in the art upon reading the present description, the resistivity of a material having significantly small dimensions may actually be higher than for the same material having larger dimensions, e.g., due to electron surface scattering. Moreover, as the thickness of the electrical lead layers 1010, 1012 decreases, the resistance thereof increases. Accordingly, the thickness of the upper and/or lower electrical lead layers 1010, 1012 is preferably between about 2 nm and about 20 nm, more preferably between about 5 nm and about 15 nm, still more preferably less than about 15 nm, but may be higher or lower depending on the desired configuration, e.g., depending on the material composition of the upper and/or lower electrical lead layers 1010, 1012. Moreover, the thicknesses (in the deposition direction) of the upper and/or lower spacer layers 1014, 1016 are preferably between about 5 nm and about 50 nm, but may be higher or lower depending on the desired configuration. For example, spacer layers having a relatively hard material composition may be thinner than spacer layers having a material composition which is less hard.

With continued reference to FIG. 11, studs 1018, 1019 may be implemented during formation of the read transducer structure 1002, using processes which would be apparent to one skilled in the art upon reading the present description. According to an example, which is in no way intended to limit the invention, the spacer layer may be formed over a mask (e.g., using sputtering or other forms of deposition), thereby creating a void in the spacer layer upon removal of the mask. Thereafter, the stud may be formed in the void, e.g., using sputtering or plating, after which the stud may be planarized. However, according to another example, a spacer layer may be formed full film, after which a via may be created, e.g., using masking and milling, and filling the via with the stud material, e.g., using atomic layer deposition (ALD), after which the stud may optionally be planarized. Moreover, it should be noted that insulating layer 1022 may be thicker than sensor 1008, thereby causing upper electrical lead layer 1010 and upper spacer layer 1014 to extend in the intended tape travel direction 1052 before continuing beyond the edge of the sensor 1008 farthest from the media facing surface 1050, e.g., as a result of manufacturing limitations, as would be appreciated by one skilled in the art upon reading the present description.

Thus, the dielectric layers 1005, 1007 and spacer layers 1014, 1016, in combination with the studs 1018, 1019, may provide protection against smearing at the media facing surface 1050 while also allowing for the shields 1006, 1004 to be in electrical communication with the electrical lead layers 1010, 1012. It follows that one or both of the shields 1006, 1004 may serve as electrical connections for the read transducer structure 1002. According to the present approach, the shields 1006, 1004 function as the leads for the read transducer structure 1002. Moreover, the current which flows towards the media facing surface 1050 tends to generate a magnetic field which is canceled out by the magnetic field created by the current which flows away from the media facing surface 1050.

However, it should be noted that the approach illustrated in FIG. 11 is in no way intended to limit the invention. Although the electrical lead layers 1010, 1012 depicted in FIG. 1 are electrically connected to upper and lower shields 1006, 1004 respectively, in other approaches, one or both of the electrical lead layers 1010, 1012 may not be electrically connected to the respective shields. According to one example, the upper and lower electrical lead layers may be stitched leads of known type, rather than each of the lead layers 1010, 1012 having a single lead. Thus, neither of the upper or lower electrical lead layers may be in electrical communication with the shields according to some approaches.

According to one configuration of apparatus 1000, a drive mechanism (not shown) may be implemented for passing a magnetic medium over the sensor 1008. In one aspect, a controller may be electrically coupled to the sensor 1008 e.g., as described with reference to other FIGS., including FIG. 1A.

Various approaches described herein are able to provide bi-directional protection for CPP transducers against shorting which may otherwise result from passing magnetic media over such transducers. Implementing a spacer layer having a high resistivity to smearing and/or plowing between the CPP data read transducer layer and each of the conducting lead portions of the transducer stack without hindering the flow of current through the sensor enables the approaches herein to maintain desirable performance over time. Moreover, as previously mentioned, although it is preferred that a spacer layer is included on either side of a sensor along the intended direction of tape travel, some of the approaches described herein may only include one spacer layer positioned between one of the leads or sensor and the shield closest thereto, such that the at least one lead is electrically isolated from the shield closest thereto.

Various configurations may be fabricated using known manufacturing techniques. Conventional materials may be used for the various layers unless otherwise specifically foreclosed. Furthermore, as described above, deposition thicknesses, configurations, etc. may vary depending on the approach.

It should be noted that although FIGS. 10-11 each illustrate a single read transducer structure (read transducer structures 1002, 1102), various approaches described herein include more than one read transducer structures above a common substrate, e.g., as shown in FIG. 2B. Furthermore, the number of read transducer structures in a given array may vary depending on the preferred approach.

In various approaches, a module e.g., as shown in any of FIGS. 2-7 may include a read transducer structure according to any approach described herein, and may further include an array of writers thereon, an array of data readers thereon, or arrays of data readers and writers thereon. The readers and/or writers may be of any type known in the art, and may be configured and/or arranged according to descriptions of writers described elsewhere herein and/or in other FIGS.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer.

The inventive concepts disclosed herein have been presented by way of example to illustrate the myriad features thereof in a plurality of illustrative scenarios, approaches, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various approaches have been described above, it should be understood that they have been presented by way of example only, and not limitation. Thus, the breadth and scope of an approach of the present invention should not be limited by any of the above-described exemplary approaches, but should be defined only in accordance with the following claims and their equivalents.

What is claimed is:

1. An apparatus, comprising:
a read transducer structure having a media facing surface, the read transducer structure having:
a lower shield;
an upper shield formed above the lower shield, the upper and lower shields providing magnetic shielding;
a current-perpendicular-to-plane sensor between the upper and lower shields;
a dielectric layer extending into the upper shield from the media facing surface for a distance that is less than a height of the upper shield; and
a second dielectric layer extending into the lower shield from the media facing surface for a distance that is less than a height of the lower shield.

2. An apparatus as recited in claim 1, wherein the dielectric layer includes at least one material selected from the group consisting of: ruthenium oxide, aluminum oxide, chrome oxide, silicon nitride, boron nitride, silicon carbide, silicon oxide, titanium oxide, and titanium nitride.

3. An apparatus as recited in claim 1, wherein the dielectric layer includes amorphous aluminum oxide.

4. An apparatus as recited in claim 1, wherein the dielectric layer includes at least partially polycrystalline aluminum oxide.

5. An apparatus as recited in claim 1, wherein the lower shield includes a plated magnetic layer below the second dielectric layer and a sputtered magnetic layer above the second dielectric layer.

6. An apparatus as recited in claim 1, wherein the upper shield includes a sputtered magnetic layer below the dielectric layer and a plated magnetic layer above the dielectric layer.

7. An apparatus as recited in claim 1, comprising a nonmagnetic spacer layer between the sensor and one of the shields, wherein the spacer layer is in electrical communication with the sensor, wherein the spacer layer is in electrical communication with the one of the shields.

8. An apparatus as recited in claim 1, wherein the sensor is a tunneling magnetoresistive sensor.

9. An apparatus as recited in claim 1, comprising an array of the read transducer structures on a common module.

10. An apparatus as recited in claim 1, comprising:
a drive mechanism for passing a magnetic medium over the read transducer structure; and
a controller electrically coupled to the read transducer structure.

11. An apparatus, comprising:
a read transducer structure having a media facing surface, the read transducer structure having:
a lower shield;
an upper shield formed above the lower shield, the upper and lower shields providing magnetic shielding;
a current-perpendicular-to-plane sensor between the upper and lower shields;
a dielectric layer extending into one of the shields from the media facing surface, wherein the dielectric layer extends into the one of the shields for a distance that is less than a height of the one of the shields; and
a nonmagnetic spacer layer between the sensor and the one of the shields; and an electrical lead layer between the sensor and the spacer layer, wherein the electrical lead layer is in electrical communication with the sensor.

12. An apparatus as recited in claim 11, wherein a resistance of the electrical lead layer along a direction orthogonal to the media facing surface is less than a resistance across the sensor along a direction parallel to the media facing surface.

13. An apparatus as recited in claim 11, wherein a conductivity of the electrical lead layer is higher than a conductivity of the spacer layer.

14. An apparatus as recited in claim 13, wherein the spacer layer is electrically insulating.

15. An apparatus as recited in claim 11, wherein the electrical lead layer is in electrical communication with the one of the shields.

16. An apparatus as recited in claim 11, wherein the electrical lead layer is not in electrical communication with the one of the shields.

17. An apparatus, comprising:
a read transducer structure having a media facing surface, the read transducer structure having:
a lower shield;
an upper shield formed above the lower shield, the upper and lower shields providing magnetic shielding;
a current-perpendicular-to-plane sensor between the upper and lower shields; and
a dielectric layer extending into one of the shields from the media facing surface for a distance that is less than a height of the shield,
wherein the shield includes a plated magnetic layer on one side of the dielectric layer and a sputtered magnetic layer on the other side of the dielectric layer.

18. An apparatus as recited in claim 17, comprising:
a drive mechanism for passing a magnetic medium over the read transducer structure; and
a controller electrically coupled to the read transducer structure.

19. An apparatus as recited in claim 17, wherein the dielectric layer is present in the lower shield, wherein the plated magnetic layer is below the dielectric layer and the sputtered magnetic layer is above the dielectric layer.

20. An apparatus as recited in claim 17, wherein the dielectric layer is present in the upper shield, wherein the sputtered magnetic layer is below the dielectric layer and the plated magnetic layer is above the dielectric layer.

* * * * *